UNITED STATES PATENT OFFICE.

WILEY E. BRYANT, MOSES Z. BRYANT, AND JOHN BRYANT, OF MILAN, TENNESSEE.

INSECTICIDE.

SPECIFICATION forming part of Letters Patent No. 501,323, dated July 11, 1893.

Application filed March 10, 1893. Serial No. 465,407. (No specimens.)

*To all whom it may concern:*

Be it known that we, WILEY E. BRYANT, MOSES Z. BRYANT, and JOHN BRYANT, citizens of the United States, residing at Milan, in the county of Gibson, State of Tennessee, have invented certain new and useful Improvements in Compounds in Insecticide Powders; and we do hereby declare the following to be a full, clear, and exact description of the invention, such as will enable others skilled in the art to which it appertains to make and use the same.

Our invention relates to an improvement in the grouping and compounding, of certain agents known to the sciences, in their dry and powdered state.

The object of the invention is to produce a cheap, efficient and reliable agent, easily handled, to prevent the generation and effect the extermination of all insect life, so common and destructive to grain when stored in quantities. We attain the said object by taking of the following named agents, in the proportions named, viz: sublimed sulphur four parts; slaked lime four parts; sulphite of soda two parts; nitrate of potash two parts; sassafras bark powdered two parts; gum camphor one four-hundredth part; thymol one four-hundredth part, and thoroughly mixing and pulverizing the said ingredients to a powdered state, when the said compound can be used either as a preventive, or, when the grain is already infected, as an exterminator.

In using our insect powder as a preventive to the infection of grain by insects, about one half the quantity is required as when it is used as an exterminator, or one ounce of the powder as above compounded to ten bushels of grain, being mixed with the grain as a preventive, and two ounces to the same amount of grain as an exterminator.

Having thus fully described our invention, what we claim as new, and desire to secure by Letters Patent, is—

The herein described compound for preventing the generation and effecting the extermination of insects in stored grain, the same consisting of the sublimed sulphur, slaked lime, sulphite of soda, nitrate of potash, sassafras bark powdered, gum camphor, and thymol, in the proportions stated, substantially as described and for the purpose set forth.

In testimony whereof we affix our signatures in presence of two witnesses.

WILEY E. BRYANT.
    MOSES Z. BRYANT.
    JOHN BRYANT.

Witnesses:
 J. E. BRAMLEY,
 M. B. PIERCE.